United States Patent [19]
Hartmann et al.

[11] Patent Number: 5,419,335
[45] Date of Patent: May 30, 1995

[54] ACOUSTIC LENS

[75] Inventors: Lothar Hartmann, Mainleus; Gerhard Buchholtz, Erlangen, both of Germany

[73] Assignee: Siemens Aktiengesellschaft, Munich, Germany

[21] Appl. No.: 108,513

[22] Filed: Aug. 18, 1993

[30] Foreign Application Priority Data

Sep. 4, 1992 [DE] Germany .................... 42 29 630.7

[51] Int. Cl.⁶ .................... A61B 8/00; A61B 17/22
[52] U.S. Cl. .................... 128/663.01; 128/660.03; 601/4
[58] Field of Search ............. 128/660.03; 73/644; 601/2-4

[56] References Cited

U.S. PATENT DOCUMENTS

| | | | |
|---|---|---|---|
| 4,630,607 | 12/1986 | Duinker et al. | 601/4 |
| 4,674,505 | 6/1987 | Pauli et al. | 601/4 |
| 4,718,421 | 1/1988 | Rohwedder et al. | 128/660.03 X |
| 4,745,921 | 5/1988 | Nowacki et al. | 601/4 |
| 5,240,005 | 8/1993 | Viebach | 601/2 |
| 5,305,731 | 4/1994 | Buchholtz | 128/660.03 |

FOREIGN PATENT DOCUMENTS

| | | |
|---|---|---|
| 0301360 | 2/1989 | European Pat. Off. |
| 3739393 | 6/1989 | Germany . |
| 4037160 | 5/1992 | Germany . |

Primary Examiner—Francis Jaworski
Attorney, Agent, or Firm—Hill, Steadman & Simpson

[57] ABSTRACT

An acoustic lens having a variable focal length for employment in an acoustic propagation medium has two lens walls, namely an entry wall and an exit wall at least one lens wall being deformable for varying the focal length, a lens liquid located between the lens walls, and a pressure compensation system which maintains the static pressure of the lens liquid the same as the static pressure of the acoustic propagation medium adjoining the deformable lens wall.

10 Claims, 3 Drawing Sheets

ACOUSTIC LENS

BACKGROUND OF THE INVENTION

1. Field of the Invention

The present invention is directed to an acoustic lens having variable focal length for utilization in an acoustic propagation medium.

2. Description Of the Prior Art

Acoustic lenses of the type having a variable focal length are employed, for example, in medical technology and serve for focusing acoustic waves in therapeutic as well as in diagnostic systems. The acoustic waves, for example, can be ultrasound waves or pressure pulses such as shockwaves.

German OS 37 39 393 discloses a lithotripter having an acoustic lens two lens walls, namely an entry wall and an exit wall, with at least one lens wall being deformable for varying the focal length. This lens functions as a positive lens that serves the purpose of focusing the pressure pulses generated with the lithotripter. It has been observed in this known acoustic lens that unintended variations in focal length as well as unintended changes in the geometry of the focus zone of the existing pressure, i.e. unintended changes of the acoustic properties of the lens, occur when the respective static pressures of the lens liquid and the acoustic propagation medium adjoining the deformable lens wall do not coincide. (The focus zone means that region surrounding the location of maximum pressure which lies within the −6 dB isobar.)

SUMMARY OF THE INVENTION

It is an object of the present invention to provide an acoustic lens of the type to be disposed in an acoustic propagation medium and containing lens liquid, with one wall of the lens being deformable to vary the focal length, and with which unintended variations of the acoustic properties of the lens are reduced.

This object is achieved in accordance with the principles of the present invention in an acoustic lens having a variable focal length for employment in an acoustic propagation medium, having two lens walls, namely an entry and an exit wall, at least one lens wall being deformable for varying the focal length, with a lens liquid situated between the lens walls, and pressure compensating means for maintaining the static pressure of the lens liquid is identical to the static pressure of the acoustic propagation medium adjoining the deformable lens wall. As a consequence of the presence of the pressure compensation means, undesired deformations of the deformable lens wall due to a difference between the static pressures of the lens liquid and the acoustic propagation medium adjoining the deformable lens wall are substantially avoided. At the same time, modifications of the acoustic properties of the lens which arise given the presence of such a pressure difference as a consequence of the deformations of the deformable lens wall are substantially avoided. Preferably, the pressure compensation means are formed by wall means for separating the lens liquid and the acoustic propagation medium adjoining the deformable lens wall such that both are at the same static pressure. This ensues by the wall means, under the influence of the pressure difference, being displaceable or deformable overall or in part to compensate for any pressure difference with respect to the lens liquid and the acoustic propagation medium adjoining the deformable lens wall, which are present on opposite sides of the wall means.

In a preferred embodiment of the invention, volume compensation means are provided containing two chambers separated from one another liquid-tight by the wall means, one of said chambers being connected to the volume situated between the lens walls and containing lens liquid, and the other chamber being connected to the volume containing the acoustic propagation medium adjoining the deformable lens wall. This embodiment provides volume compensation means required in any event for compensating the volume changes which occur given variations of the focal length, which is fashioned for maintaining the static pressure of the lens liquid is equal to the static pressure of the acoustic propagation medium adjoining the deformable lens wall.

Preferably the wall means are flexibly fashioned, for example as a flexible membrane having a corrugated cross-section. A low manufacturing outlay results in this way. Moreover, it is assured, particularly in the case of a membrane having a corrugated cross-section, that the deformations of the membrane required for volume and pressure compensation are possible without significant losses caused by internal friction in the membrane material, which is a prerequisite for an optimally complete pressure compensation.

It is also possible, however, to fashion the wall means such as a substantially rigid wall section which is freely displaceable in at least one direction and that is connected to the volume compensation means with a flexible wall section. The flexible wall section, for example, can then be executed as an accordion bellows or rolling membrane.

The wall means may also be formed by a substantially freely displaceable piston, but particular care must be exercised to insure that the friction which occurs given movement of the piston is adequately low in order to enable an optimally complete pressure compensation.

DESCRIPTION OF THE PREFERRED EMBODIMENTS

Figure 1:
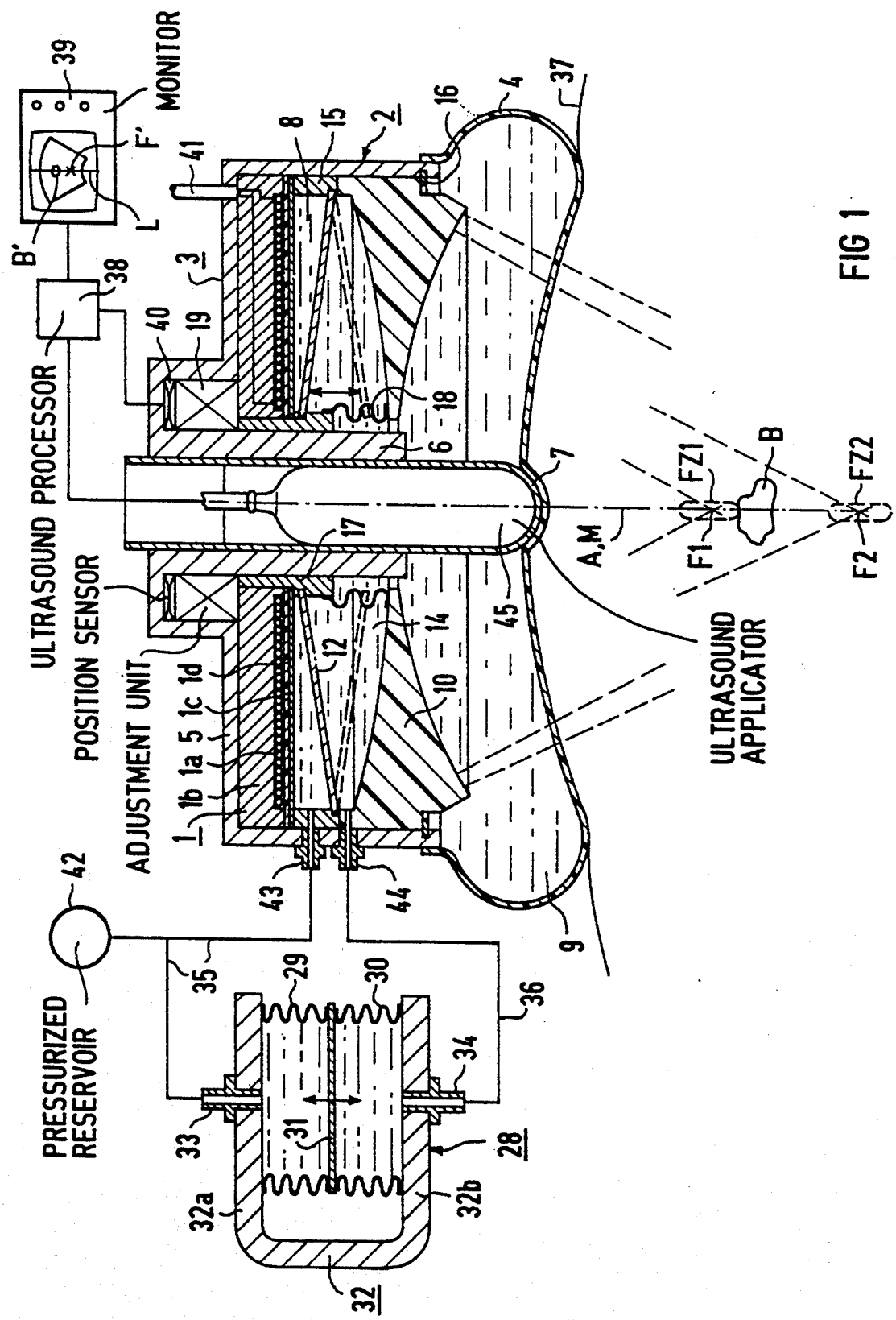
FIG. 1 is a longitudinal section through a pressure pulse generator containing an acoustic lens of the invention, shown schematically.

A generator for acoustic waves is shown in FIG. 1 in the form of a pressure pulse generator as employed in medicine for, for example, the disintegration of calculi. This generator contains an electromagnetic pressure pulse source 1 and an acoustic positive lens 2 allocated thereto, which focuses the essentially planar pressure pulses emanating from the pressure pulse source 1 onto one of an approximately cigar-shaped, spatial focus zone FZ1 or FZ2 (or zones therebetween). The focus zone is that region limited by a −6 dB isobar, i.e. that region within which the pressure of the pressure pulses is at least equal to half the maximally occurring pressure. Both the pressure pulse source 1 and the acoustic positive lens 2 are accommodated in a housing 3 that has an end distal from the pressure pulse source 1 closed liquid-tight with an elastic, flexible application cushion 4. The pressure pulse source, for example, can be an electromagnetic pressure pulse source as disclosed in U.S. Pat. No. 4,674,505 and in European Application 0 301 360. At the end adjoining the pressure pulse source 1, the housing 3 has a base 5 provided with a bore, with a tubular inside wall 6 extending from the edge of the bore in the direction toward the application cushion 4. A tube 7, whose purpose shall be set forth below, is accepted liquid-tight in the bore of the inside wall 6.

The space situated between the pressure pulse source 1 and the positive lens 2 is filled with water 8 the space situated between the positive lens 2 and the application cushion 4 is filled with water 8 or, respectively, 9 as acoustic propagation medium.

The positive lens 2 is a ring-shaped, particularly annular, elastically deformable liquid lens that has a ring-shaped or annular entry wall 12, a ring-shaped or annular exit wall 10 and a lens liquid 14 located between these two walls. The outside edge of the entry wall 12 formed, for example, of polymethylpentene (TPX) or of polytetrafluorethylene (PTFE), is accepted liquid-tight in a channel limited by a retainer ring 15 and the exit wall 10. The retainer ring 15 is accepted between the pressure pulse source 1 and the exit wall 10, the exit wall 10 being fixed so as to be axially non-dislocatable with a snap ring 16. The exit wall 10 is a biconcave, solid lens formed of a material, for example polystyrol, in which the speed of the propagation of sound is higher than in the water 9 provided as the acoustic propagation medium. The exit wall 10 is introduced liquid-tight into the housing 3. The retainer ring 15 has an outer surface pressed liquid-tight against the housing 3. The inside edge of the entry wall 12 is accepted liquid-tight in a circumferential channel of a tube part 17 that is put in place liquid-tight onto the outer surface of the inside wall 6, and which is displaceable thereon in the axial direction, i.e. in the direction of the center axis M of the positive lens 2. Seal means (not shown in FIG. 1) can be provided between the bore of the tube part 17 and the outer surface of the inside wall 6. Seal means can likewise be provided between the outer circumference of the exit wall 10 and the inside wall of the housing 3.

The circumferential edge of an accordion bellows 18 is attached liquid-tight to an end of the tube part 17 adjoining the exit wall 10. The other circumferential edge of the accordion bellows 18 is attached, likewise in liquid-tight fashion, to the exit wall 10 in the region of the inner edge thereof. The accordion bellows 18 together with the exit wall 10, the entry wall 12, the retainer ring 15 and the tube part 17 thus limit the volume of the positive lens 2 that contains the lens liquid 14. An adjustment unit 19 schematically indicated in FIG. 1, acts on the end of the tube part 17 distal from the entry wall 12, the tube part 17 being axially displaceable on the inside wall 6 by the adjustment unit 19. As a result of the displacement of the tube part 17 the focal length of the positive lens 2 can be varied by deforming the entry wall 12. The adjustment means 19, which a person skilled in the art can easily realize on the basis of his or her expertise, can be, for example, an electric motor and suitable gearing elements for converting the rotational motion of the electric motor into a straight-line motion. The adjustment unit 19 is accepted in an annular depression of the base 5 of the housing 3.

When, as in the illustrated exemplary embodiment, the lens liquid 14 is a liquid in which the sound propagation speed is lower than in the water provided as the acoustic medium (for example Fluorinert ® FC 75 or Flutec ® PP 3) the lens liquid 14 intensifies the focusing effect of the exit wall 10 fashioned as a solid lens, given the extreme position of the tube part 17 and the position of the entry wall 12 shown with solid lines in FIG. 1. When the tube part 17 is gradually adjusted in the direction toward the exit wall 10, the focusing effect of the lens liquid 14 situated between the entry wall 12 and the exit wall 12 is diminished and gradually changes into a slight defocusing effect. In the opposite extreme position of the tube part 17 (resulting in the position of the entry wall 12 indicated with dashed lines for FIG. 1), the lens liquid 14 thus weakens the focusing effect of the exit wall 10. This means that the position of the focus zone of the pressure pulses generated with the pressure pulse source 1 and focused with the positive lens 2 can be adjusted so that the focus zone FZ1 located closer to the pressure pulse source 1 arises for the extreme position of the tube part 17 shown with solid lines in FIG. 1 and the focus zone FZ2 at a greater distance therefrom arises for the extreme position indicated with dashed lines. Dependent on the position of the tube part 17 along the acoustic axis A of the positive lens 11, (identical to the central axis M thereof), the focus zone of the pressure pulses can be shifted with infinite variation between these two extreme positions.

Since the volumes located between the pressure pulse source 1 and the entry wall 12, and between the entry wall 12 and the exit wall 10, change when the tube part 17 is adjusted, schematically indicated connecting branches 43 and 44 are provided via which these volumes are in communication with a volume compensation unit 28. It is self-evident that seal elements that are not shown in FIG. 1 and that are arranged between the inside wall of the housing 3 and the retainer ring 15 must assure, as needed, that the water 8 and the lens liquid 14 remain separated from one another. The volume compensation unit 28 contains two accordion bellows 29 and 30 the circumferential edges of these accordion bellows 29 and 30 that face toward one another being connected liquid-tight to a wall 31 that separates the lens liquid 14 from the water 8. The bellows 29 and 30 consist of material having a good formability, such as metal or a polymeric material having low internal friction. The circumferential edges of the accordion bellows 29 and 30 spaced from one another are respectively connected liquid-tight to a legs 32a and 32b of a rigid, U-shaped profile 32. Two ports 33 and 34 are connected via respectively schematically indicated lines 35 and 36 to ports 43 and 44 which discharge into the two volumes formed in this way. When the tube part 17 is adjusted, thus, the required volume compensation can ensue with respect to the water 8 as well as with respect to the lens liquid 14, whereby the wall 31 is caused to be dislocated corresponding to the motion of the tube part 17.

The pressure pulse source 1 includes a flat coil 1a having helical turns arranged on a planar seating surface of a coil carrier 1b formed of insulating material, and separated from a planar, electrically conductive membrane 1d by an insulating foil 1c. The coil 1a is charged with high-voltage pulses via a high-voltage cable 41 connected to the terminals of the coil 1a by a high-voltage pulse generator (not shown). As a consequence of the pulse-like current flowing through the coil 1a given a high-voltage pulse, a magnetic field is built up extremely quickly. This results in a current that is opposite the current flowing through the coil 1a being induced in the membrane 1d. Since the magnetic field associated with the current flowing through the membrane 1d is oppositely directed relative to the magnetic field associated with the current flowing through the coil 1a, the membrane 1d is suddenly repelled from the coil 1a. As a result, an essentially planar pressure pulse is introduced into the water 8, this pressure pulse being focused with the positive lens 2. The focused pressure pulse emerging from the positive lens 2 proceeds through the water 9 and the body tissue of the patient to a region B to be treated. The pressure pulse, moreover, gradually intensifies on its path to the region B to be treated to form a shockwave, i.e., a pressure pulse having an extremely steep leading front.

In order to return the membrane 1d to its initial position after a pressure pulse has been generated, (i.e., the membrane 1d pressing flush against the coil 1a the insulating foil 1c therebetween) the water 8 situated between the membrane 1d and the entry wall 12 is pressurized above the ambient pressure. This is indicated in FIG. 1 by a pressurized reservoir 42 connected to the line 35. Means allowing an adjustment of the height of the pressure with which the water 8 is charged can be provided in a known manner (not shown). A pressure compensation thereby ensues such that the lens liquid 14 is at the same static pressure as the water 8 since the substantially rigid wall 31 of the volume compensation means 28 adjusts in the direction of the double arrow so that substantially the same pressure prevails in both chambers of the volume compensation means 28, and thus in the water 8 and in the lens liquid 14 as well. Unintentional deformations of the entry wall 12 are thereby avoided, which arise given different static pressures of the water 8 and of the lens liquid 14 and which have a disadvantageous influence on the acoustic properties of the positive lens 2. The wall 31 and the accordion bellows 29 and 30 thus form pressure compensation means. These components simultaneously serve as components of the volume compensation unit 28 by virtue of the limitation of their chambers.

For implementing a treatment, for example, one proceeds such that the generator is placed against the surface of the body 27 of a patient to be treated (schematically indicated in FIG. 1) with the application cushion 4. With the assistance of an ultrasound applicator 45 that is introduced into the tube 7, the generator and the body 37 of the patient are subsequently aligned relative to one another such that the region B to be acoustically-irradiated lies on the acoustic axis A of the generator. Given employment of an ultrasound applicator 45 in the form of a B-scan applicator, this is easy to accomplish when the ultrasound applicator 45 together with the ultrasound processor 38 generates an ultrasound image (displayed on the monitor 39 thereof) of a body slice of the patient that contains the acoustic axis A and into which a line L indicating the position of the acoustic axis A is mixed. A cruciform mark F', for example, is also mixed into the ultrasound image, this cruciform mark F' indicating the position of the center of the focus zone on the acoustic axis A that corresponds to the position of the tube part 17. To this end, a position sensor 40, for example a variable resistor, which is schematically indicated in FIG. 1 and is allocated to the adjustment unit 19 and supplies a signal corresponding to the position of the tube part 17 to the ultrasound processor 38, which in turn displaces the mark F' as required. The respective center of the focus zone for the two extreme positions of the focus zone FZ1 and FZ2 are referenced F1 and F2 in FIG. 1. In order to assure that the region B to be acoustically-irradiated lies not only on the acoustic axis A but also lies in the center of the focus zone of the pressure pulses, the adjustment unit 19 is actuated such that the mark F' coincides on the picture screen of the monitor 39 with the image B' of the region B to be acoustically-irradiated. When this is the case, the region B to be acoustically-irradiated can be charged with pressure pulses in the required way.

Figure 2:
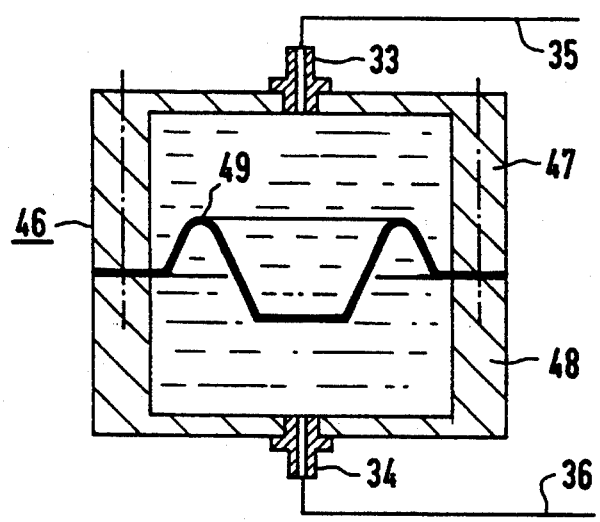
FIGS. 2 through 4 respectively show different embodiments of the lens of the invention, each in a schematic, partial longitudinal sectional view.

The embodiment of FIG. 2 differs from that set forth above only in view of its volume compensation unit 46, for which reason only this unit is shown. The volume compensation unit 46 has two cup-like housing parts 47 and 48. A flexible, corrugated membrane 49 that forms wall means for separating the lens liquid 14 and the water 8 is disposed between the parts 47 and 48, which are screwed together with a plurality of screws distributed over the circumference. Only the center lines of two screws are indicated in FIG. 2. The membrane 49 subdivides the volume surrounded by the housing parts 47 and 48 into two chambers to which the ports 33 and 34 are respectively allocated. As a consequence of the corrugation of the membrane 49, it can be deformed within the volume for pressure compensation without significant deformations being necessary. Since a polymeric material having low internal friction, for example buna N (NBR) or silicone is employed as the material for the membrane 49, substantially complete pressure compensation is possible. At any rate, any remaining pressure differences are not large enough to deform the entry wall 10 to such an extent that perceptible changes of the acoustic properties of the positive lens 2 occur.

Figure 3:
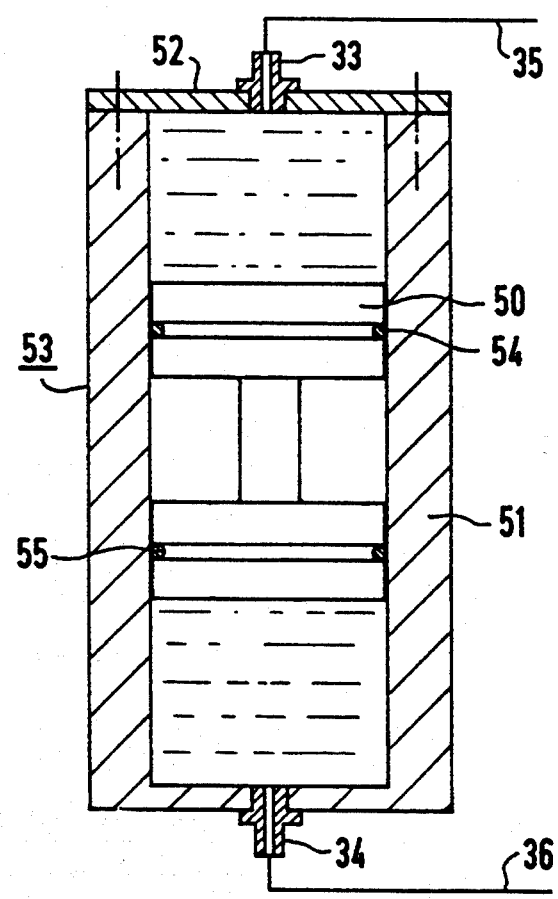

Whereas in the embodiment of FIG. 1 the separating of the two chambers ensues with a freely displaceable, substantially rigid wall section, namely the wall 31, and flexible wall sections, namely the accordion bellows 29 and 30, and flexible wall means in the form of a corrugated, flexible membrane are provided in the case of FIG. 2, wall means in the form of a piston 50 are provided in the embodiment of FIG. 3. This piston 50 subdivides the volume of the volume compensation unit 53, limited by a cylindrical housing port 51 and a cover 52 into two chambers. The seal between the piston 50 and the inside wall of the housing 51 ensues with two seal rings 54 and 55. The circular disk-shaped cover 52 is secured to the cylindrical housing 51 with screws distributed around the circumference of the cover 51, whereby only the center lines of two screws are indicated in FIG. 3. In the case of the volume compensation unit 53, it is critical that the friction occurring between the piston 50 and the seal rings 54 and 55 and the inside wall of the housing 51 be so low that any pressure differences that may potentially remain are inadequate for deforming the entry wall 12 to such an extent that undesired changes of the acoustic properties of the positive lens 2 occur.

Figure 4:
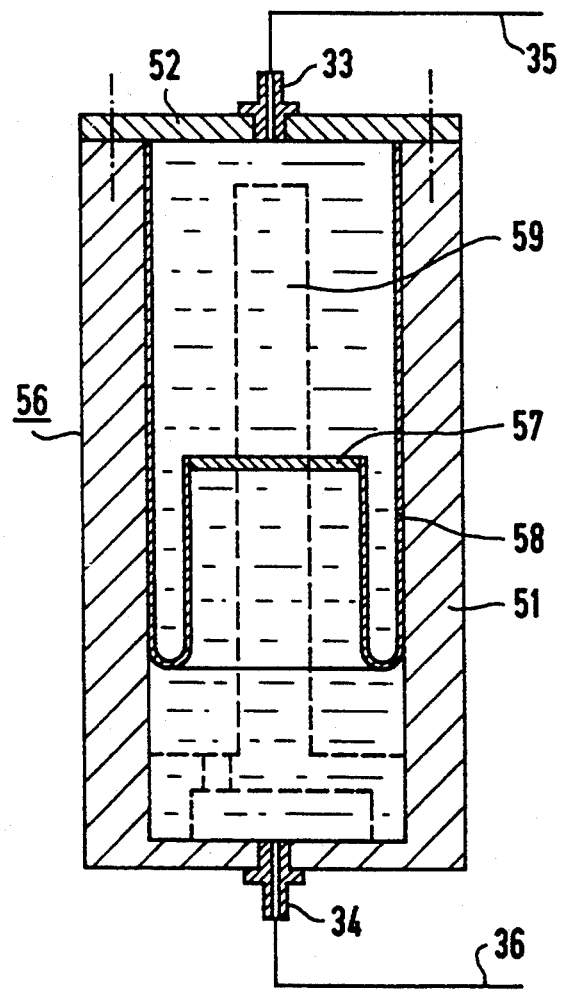

In the exemplary embodiment of FIG. 4, the separation of the two chambers of the volume compensation unit 56, similar to the embodiment set forth first, ensues with a substantially rigid wall means, namely the partition 57, that is connected in freely mobile fashion to the housing of the volume compensation unit 56 via a rolling membrane 58 that forms a flexible wall section. The housing is again composed of a cylindrical housing part 51 and a cover 52 screwed thereto. When a rolling membrane 58 composed of a polymeric material having low internal friction is employed, a substantially complete pressure compensation is possible, so that undesired changes of the acoustic properties of the positive lens 2 as a consequence of deformations of the entry wall 12 caused by a pressure difference are practically impossible.

In the volume compensation unit 56, moreover, a guide rod 59, indicated with dashed lines in FIG. 4 can also be provided in order to avoid canting of the partition 57. The seal required between the partition 57 and the guide rod 59, however, causes frictional forces that could have a disadvantageous effect on the pressure compensation under certain circumstances.

In the described exemplary embodiments, the positive lens 2 has only one deformable lens wall, namely the entry wall 12. There is also the possibility of implementing both lens walls as a deformable lens walls or of executing the exit wall instead of the entry wall as deformable lens wall. It is self-evident that the outside and/or inside edge of the exit wall should be kept free of any bending moment when the exit wall is executed as the deformable lens wall.

In the described exemplary embodiments, the positive lens 2, and thus the deformable lens wall 12 as well, is fashioned ring-shaped or annularly. The positive lens 2, however, need not necessarily be annularly formed, but can be executed without a central opening. The lens walls are then likewise executed without a central opening. Such a structure is disclosed, for example, in German 37 39 393.

The pressure compensation means are integrated into the respective volume compensation unit 28, 46, 53 or 56 in all exemplary embodiments that have been set forth. This need not necessarily be the case. For example, there is also the possibility of providing compensation vessels for the lens liquid 14 and the water 8 that are completely independent of one another and of undertaking suitable measures for charging both liquids with the same static pressure. For example, a common pressurized reservoir could be provided, this serving the purpose of charging both liquids with the same static pressure.

It is self-evident, moreover, that the invention cannot be employed in the case of lenses wherein the deformation of the deformable lens wall is effected in a known way by a difference between the static pressures of the lens liquid and of the acoustic propagation medium adjoining the deformable lens wall. It is also self-evident that the invention is only of significance when either the lens liquid or the acoustic propagation medium adjoining the deformable lens wall must have a static pressure deviating from the ambient pressure. The pressure compensation means, of course, are superfluous when both the lens liquid as well as the acoustic propagation medium adjoining the deformable lens wall can have a static pressure that is the same as the ambient pressure.

The exemplary embodiments relate to the employment of the acoustic position lens of the invention in a therapy apparatus that generates pressure pulses in the form of shockwaves. The invention can also be employed, however, in combination with other acoustic waves, for example ultrasound generated as continuous sound. Moreover, the acoustic lens of the invention can also be employed in diagnostic apparatus in addition to being employed in therapy apparatus. Finally, the lens of the invention can also be employed for non-medical purposes.

Although modifications and changes may be suggested by those skilled in the art, it is the intention of the inventors to embody within the patent warranted hereon all changes and modifications as reasonably and properly come within the scope of their contribution to the art.

We claim as our invention:

1. An acoustic lens having a variable focal length for use in an acoustic propagation medium, comprising:
   an entry lens wall and an exit lens wall, one of said entry or exit lens walls being deformable for varying the focal length of said acoustic lens, the deformable lens wall having acoustic propagation medium adjacent thereto, said acoustic propagation medium being contained in a volume and being at a static pressure;
   means linked to said deformable lens wall for mechanically displacing said deformable lens wall toward and away from the other of said lens walls;
   lens liquid disposed in a volume between said entry lens wall and said exit lens wall, said lens liquid being at a static pressure; and
   pressure compensation means operatively connected to said volume containing said lens liquid and to said volume containing said acoustic propagation medium for maintaining the static pressure of said lens liquid the same as said static pressure of said acoustic propagation medium adjacent said deformable lens wall as said deformable lens wall is mechanically displaced.

2. An acoustic lens as claimed in claim 1 wherein said pressure compensation means includes wall means for maintaining said lens liquid and said acoustic propagation medium adjacent said deformable lens wall separate and at the same static pressure.

3. An acoustic lens as claimed in claim 2 further comprising volume compensation means, in fluid communication with said volume containing said acoustic propagation medium and said volume containing said lens liquid for accommodating volume changes when said deformable lens wall is deformed to vary said focal length, said volume compensation means containing said wall means and said wall means dividing said volume compensation means into two chambers separated liquid-tight from each other, one of said chambers being connected to said volume containing said lens liquid and the other of said chambers being connected to said volume containing said acoustic propagation medium adjacent said deformable lens wall.

4. An acoustic lens as claimed in claim 2 wherein said wall means consists of flexible material.

5. An acoustic lens as claimed in claim 4 wherein said wall means comprises a flexible membrane.

6. An acoustic lens as claimed in claim 5 wherein said flexible membrane has a corrugated cross-section.

7. An acoustic lens as claimed in claim 2 wherein said wall means comprises a substantially rigid wall section connected to a flexible wall section, said flexible wall section being deformable to permit displacement of said rigid wall section.

8. An acoustic lens as claimed in claim 7 wherein said flexible wall section comprises a rolling membrane.

9. An acoustic lens as claimed in claim 7 wherein said flexible wall section comprises an accordion bellows.

10. An acoustic lens as claimed in claim 1 wherein said pressure compensation means includes a housing in fluid communication at opposite ends with said volume containing said acoustic propagation medium adjacent said deformable lens wall and said volume containing said lens liquid, and wherein said wall means comprises a piston displaceable in said housing.

* * * * *